United States Patent
Gonzales (10) Patent No.: US 8,522,202 B2
(45) Date of Patent: Aug. 27, 2013

(54) SYSTEM AND METHOD FOR MANAGING COMPUTER ENVIRONMENT SETUP REQUESTS

(75) Inventor: Jesus Orlando II Gonzales, Highlands Ranch, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 1129 days.

(21) Appl. No.: 12/109,111

(22) Filed: Apr. 24, 2008

(65) Prior Publication Data

US 2009/0271764 A1     Oct. 29, 2009

(51) Int. Cl.
    *G06F 9/44*      (2006.01)

(52) U.S. Cl.
    USPC ........................................................ 717/115

(58) Field of Classification Search
    USPC ............. 717/165–178; 707/99.203; 709/221
    See application file for complete search history.

(56) References Cited

U.S. PATENT DOCUMENTS

| | | | |
|---|---|---|---|
| 6,618,857 B1 * | 9/2003 | Marino et al. | 717/175 |
| 6,810,364 B2 * | 10/2004 | Conan et al. | 702/188 |
| 6,964,044 B1 * | 11/2005 | Hudson et al. | 717/177 |
| 7,069,541 B2 * | 6/2006 | Dougherty et al. | 717/122 |
| 7,167,865 B1 * | 1/2007 | Tharp et al. | 1/1 |
| 7,899,892 B2 * | 3/2011 | Tremblay et al. | 709/221 |
| 7,950,010 B2 * | 5/2011 | Goger et al. | 717/178 |
| 2008/0005787 A1 * | 1/2008 | Aldred | 726/4 |
| 2008/0098385 A1 * | 4/2008 | Alger et al. | 717/174 |
| 2008/0162280 A1 * | 7/2008 | Jacobs et al. | 705/14 |
| 2008/0235611 A1 * | 9/2008 | Fraley et al. | 715/772 |
| 2008/0306986 A1 * | 12/2008 | Doyle, Sr. | 707/102 |

* cited by examiner

*Primary Examiner* — Don Wong
*Assistant Examiner* — Daxin Wu
(74) *Attorney, Agent, or Firm* — Cooley LLP; Walter G. Hanchuk; Nathan W. Poulsen (57) ABSTRACT

A system for managing requests for setting up computer test environments includes a setup request database storing the test environment setup requests and a request management module which provides a standardized user interface screen to submit the requests. If the request submitted by a user does not contain all of the required information necessary to set up the test environment, the user is prompted to provide the missing information, thereby minimizing a subsequent exchange of communications due to missing information.

22 Claims, 6 Drawing Sheets

36 eTracker — CASQA Website

SUBMIT REQUEST

Submit | Query
48    46

| Field | Value |
|---|---|
| *Title: | |
| *Environment: | Choose Environment |
| *Owner: | Choose Owner |
| *RTN: | |
| *Install Date: | MM/DD/YY |
| Additional Email: | |

| | | | |
|---|---|---|---|
| | Multi Vic: ☐ VIC ▸ Way ▸ | | Volume Test: ☐ |
| | *Required By: MM/DD/YY | | |
| | *Cost Center: | | |
| | *Install Description: ▸ | | |
| | Please separate by ";" and limit to 3 | | |

| CTE Execution: ☐ | CTE-IOA: ☐ | VCMS: ☐ | Freeze Libs: ☐ |
|---|---|---|---|

| Field | Value |
|---|---|
| *CPD: | MM/DD/YY |
| *Config: | |
| *Subscriber: | *MVV Config: |
| *Currency: | *Pilot: |
| UBF: | *GL Account: |
| | Binkeys (for VCMS): |

| | Lib 1 | Lib 2 | Lib 3 | Lib 4 | Lib 5 | |
|---|---|---|---|---|---|---|
| Library Concat: | Lib 1 | Lib 2 ▸ | Lib 3 ▸ | Lib 4 ▸ | Lib 5 ▸ | Stage: ☐ |
| Tablebase Concat: | Lib 1 ▸ | Lib 2 ▸ | Lib 3 ▸ | Lib 4 ▸ | Lib 5 ▸ | Stage: ☐ All Prod: ☐ What's This? |

Applications:
- APF ▸ · RSI ▸ · VSS ▸ · SMS ▸ · Interlink ▸ · CAI/CMLS ☐ · TIM ☐
- GRS ☐ · RECON ☐ · MQ ☐ · EM/DSM ☐ · Monthly ☐ · Dispatcher ☐

[ ADD RECORD ] — 44

Special Instructions:

| # | Title | Status | Environment | Requester | Owner |
|---|---|---|---|---|---|
| 3129 | Australia Test data | Submitted | Non-APF | Anderson,Bill | Liebmann, Gad |
| 3145 | Cross System test with RC&S application | Submitted | QPA.RLS4 | Whatley, Kevin | Whatley, Kevin |
| 3156 | Regenerating EU09 as Functional Environment for RTN 811958, RTN 812008 October 2007 | Submitted | EPA.EU09 | Challa, Lalitha | Hsiung, Paul |

| eTracker | | | | | CASQA Website |
|---|---|---|---|---|---|
| | | RECORD VIEW | | | Submit IQuery |
| | Title: | Australia Test data | eTracker# 3129 | | |
| | Environment: | Non-APF | | | |
| | Owner: | Liebmann, Gad | | Volume Test: | No |
| | RTN: | 812412 | | Status: | Completed |
| | Install Data: | 8/24/2007 | | Cost Center: | 85076 |
| | Requester: | Anderson, Bill | | Install Description: | Non-Business |
| | Submitted On: | 7/26/2007 7:12 : 00 PM | | Required By: | 9/28/2007 |
| | Additional Email: | sport@visa.com;millan@visa.com;njavier@visa.com | | | |
| CTE Execution: | N | CTE-IOA: N | VCMS: N | Freeze Libs: | N |
| CPD: | 4/14/2007 | | | | |
| Config: | QBR.CF.CNFG.RF1225V1.D072307 | | | MVV Config: | QBA.MVVCNFG.RF1225V1.D072307 |
| Subscriber: | QTI.TP.SUBSCRIB.RF1225V1.D072307 | | | Pilots: | QT1.RF1225V1.PILOT.D072307 |
| Currency: | QBR.CAS.JUL2007.ZZ.CURRENCY | | | GL Account: | |
| UBF: | | | | Binkeys(for VCMS): | |
| Library Concat: | 02-STG-PROD | | | | |
| Tablebase Concat: | 02-PROD CENTRAL Only | | | | |
| Applications: | | | | | |
| Special Instructions: | We need re-builds on several large Australia acquirers. We are looking for variety, not volume. Australia is changing lots of fee hierarchies. We want to verify there are no changes that are not expected. Don't change the dates in the transactions but do tell is what CPD the re-builds came form. | | | | |
| Audit Trail: | ypronine 9/28/2007 Status: Submitted to Completed<br>Required By: 7/30/2007 to 9/28/07<br>Wanderso 7/27/2007 Owner: Central Test Environments to Liebmann, Gad<br>Wanderso 7/27/2007 Notify E mail: sport@visa.com;millan@visa.com to<br>sport@visa.com;millan@visa.com;njavier@visa.com | | | | |
| | | REPLICATE | | | |

SYSTEM AND METHOD FOR MANAGING COMPUTER ENVIRONMENT SETUP REQUESTS

FIELD OF THE INVENTION

The present invention relates to a data processing system, and more particularly a system for managing computer environment setup requests.

BACKGROUND OF THE INVENTION

A large transaction processing system such as VisaNet™, processes over one hundred million financial transactions (e.g., credit card transactions) per day. Typically, the processing system runs on a platform which may include one or more mainframe computers. In complex cases, the processing system runs under several interconnected computer platforms that are located in multiple locations for redundancy and workload sharing.

Making software modifications or enhancements to a live or production computer system requires careful planning. Typically, a set of software modification projects are grouped into an install plan which has a projected install date. On the install date, all of the modification projects in the install plan are released into the production system at the same time.

Each software modification project typically adds or modifies a particular feature. An example of a software modification project may be a feature to add a new transaction type such that the computer system can handle prepaid card transactions in addition to credit/debit card transactions.

Each software modification project is assigned a number such as a request tracking number (RTN) for tracking purposes. Once software changes related to a particular RTN are made, they are turned over to a software tester.

The tester creates a set of test cases (e.g., test prepaid card transactions) to run against the modified software. The test cases should include different types of transactions to include all of the expected scenarios that may be encountered in the real world. For example, one test case may be a purchase transaction scenario from an overseas POS terminal using a prepaid card issued by issuer A while another test case may be a chargeback transaction scenario from a domestic POS terminal using a prepaid card issued by issuer B.

Next, the tester needs to create a test environment in a test computer system so that the production system is not affected in any way. The test environment typically includes copies of all production applications that are needed, modified applications and test cases. In the case of a mainframe using job control language (JCL) that communicates with the operating system of the mainframe, the test environment comprises a tester controlled library containing copies of production JCL, production procedures (PROCS), modified programs or applications, test JCL programs, test parameter files used by the test JCL programs, and test data files.

In the case of a JCL mainframe environment, the test environment is specified using a schedule of jobs that instructs the mainframe to load, copy and execute certain applications and procedures, among other things.

Typically, the tester would need to set up a series of different test environments to fully test each software modification project. Each time the tester requires the setup of a new test environment, the request is sent to an information technology (IT) department that manages computer resources.

Conventionally, the testers request generation and regeneration of test environments through email. Because there are no standard formats to follow in submitting the request, testers often forget to include all of the parameters that are needed to set up the test environments. This has caused a needless exchange of back and forth communications just to complete the required setup parameters. Another disadvantage of the conventional method is that if a manager wants to see a report such as how many environment setup requests were submitted for a particular software modification project or for a full install plan, the preparation of the report becomes a gargantuan task to go through all of the email exchanges with the testers. Also, the manually prepared report may be inaccurate as some email requests may have been deleted or overlooked.

Therefore, it is desirable to provide a system and method for more efficiently and more accurately managing computer environment setup requests so as to eliminate incomplete environment setup requests. It is also desirable to provide such a system with a reporting capability to allow managers to easily track the submitted environment setup requests.

SUMMARY OF THE INVENTION

According to one aspect of the present invention, a system for managing computer environment setup requests is provided. The system includes a setup request database storing the computer environment setup requests. Each setup request includes environment setup parameters for running a computer job. A request management module running in a computer determines whether the environment setup parameters received from a user includes all required information. If not, the management module requests additional information from the user. This feature thereby minimizes subsequent exchanges of communications due to missing information in the original request.

Moreover, the setup request database storing the computer environment setup requests allows a manager to automatically generate various types of reports in real-time to more accurately monitor the test environment setup requests.

DETAILED DESCRIPTION OF THE INVENTION

For purposes of this application, the terms "code", "program", "application", "module", "software code", "software module" and "software program" are used interchangeably to mean software instructions that are executable by a processor. The words "data" and "criteria" are used to refer to either a single item or multiple items of information.

Figure 1:
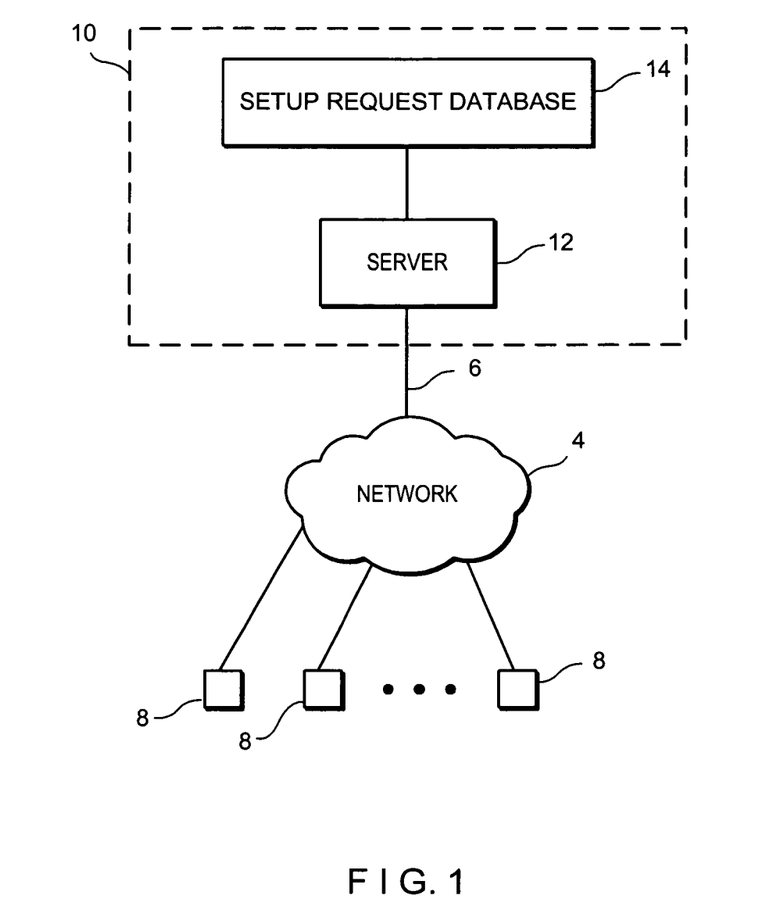
FIG. 1 is a block diagram of an exemplary test environment setup request management system.

An exemplary block diagram of a test environment setup request management system 10 is shown in FIG. 1. The management system 10 contains a server 12 and a setup request database 14 in communication with the server. The system 10 can be accessed by software testers to submit new test environment setup requests and any manager interested in tracking the submitted setup requests. In the embodiment shown, the setup request database 14 is a relational database using MS SQL Server from Microsoft Corporation of Redmond, Wash. although any type of a database management system can be used.

The system 10 is connected to a computer network 4 through a communication link 6. In the embodiment shown, the network 4 may be a private network such as an Intranet, private network such as an Internet, or a combination of private and public networks.

Figure 2:
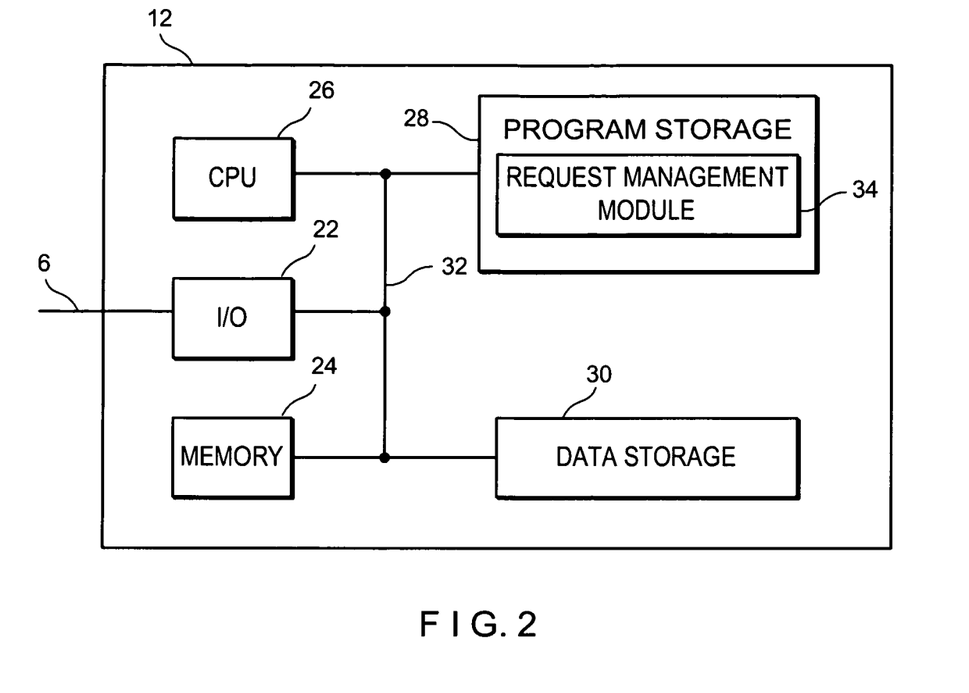
FIG. 2 illustrates a block diagram of a server computer that stores and executes an environment setup request management module.

Referring now to FIG. 2, the server 12 of the present invention centrally manages submissions of test environment setup requests. In one embodiment, the software code being tested in the test environment relates to code for a processing system that processes financial transactions involving financial presentation devices (e.g., credit cards and debit cards) that are presentable to providers of goods or services. The server 12 includes a multitasking, real-time software technology that can concurrently handle multiple users.

The server 12 is connected to the communication link 6 through an I/O interface 22, which receives information from and sends information over the communication link 6 to the computers 8 of various users. The server 12 of FIG. 2 includes dynamic memory storage 24 (e.g., DRAM), processor (CPU) 26, program storage 28, and permanent data storage 30 (e.g., disk drive), all commonly connected to each other through a bus 32. The program storage 28 stores, among others, a request management module 34 for managing requests for setting up new computer test environments. Any of the software programs in the program storage 28 and data from the data storage 30 are transferred to the memory 24 as needed and is executed by the CPU 26. In the embodiment shown, the request management module 34 is written in Active Server Pages (ASP) language.

The server 12 can be any computer such as a personal computer, minicomputer, workstation or mainframe, or a combination thereof. While the server 12 is shown, for illustration purposes, as a single computer unit, the system may comprise a group/farm of computers which can be scaled depending on the processing load and database size.

Figure 3:
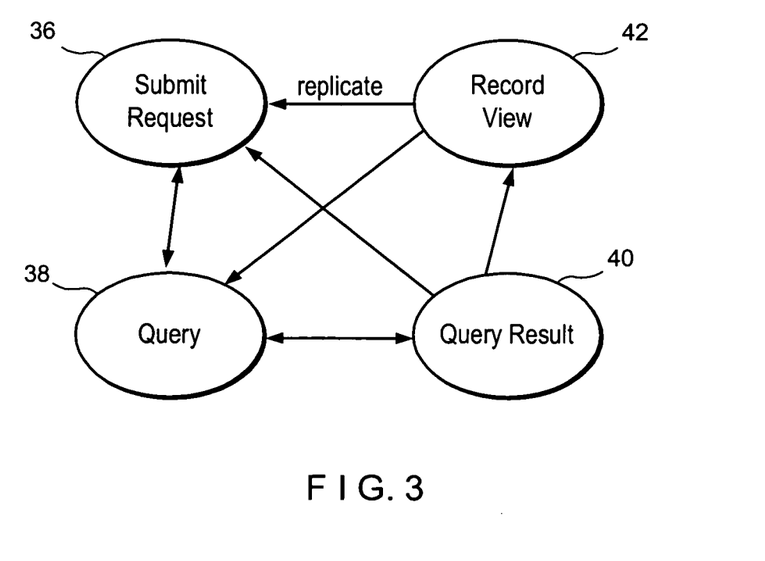
FIG. 3 illustrates a menu map through which a user navigates the request management module of FIG. 2.

FIG. 3 illustrates a menu map through which a user navigates the request management module 34. Upon execution of the request management module 34, the submit request web page 36 is displayed at the user's computer 8 through which a request for a test environment setup is submitted. Advantageously, error checking is performed to make sure that all of the required fields are populated and that those populated fields are in correct format. A query web page 38 is used to specify selection criteria to retrieve one or more test environment setup request records. Selected fields of the retrieved setup request records are displayed in a query result web page 40 which includes a clickable link for each setup request record. Clicking on one of the links displays a record view web page 42 for the selected record. Through the web page 42, the request management module 34 allows the user to replicate all of the displayed fields into a new submit request page 36. Advantageously, this replication feature allows the user to search for a similar environment setup request that has been previously submitted in order to save typing time and reduce possible errors. A more detailed description of all of the web pages 36-42 will now be discussed.

Figure 4:
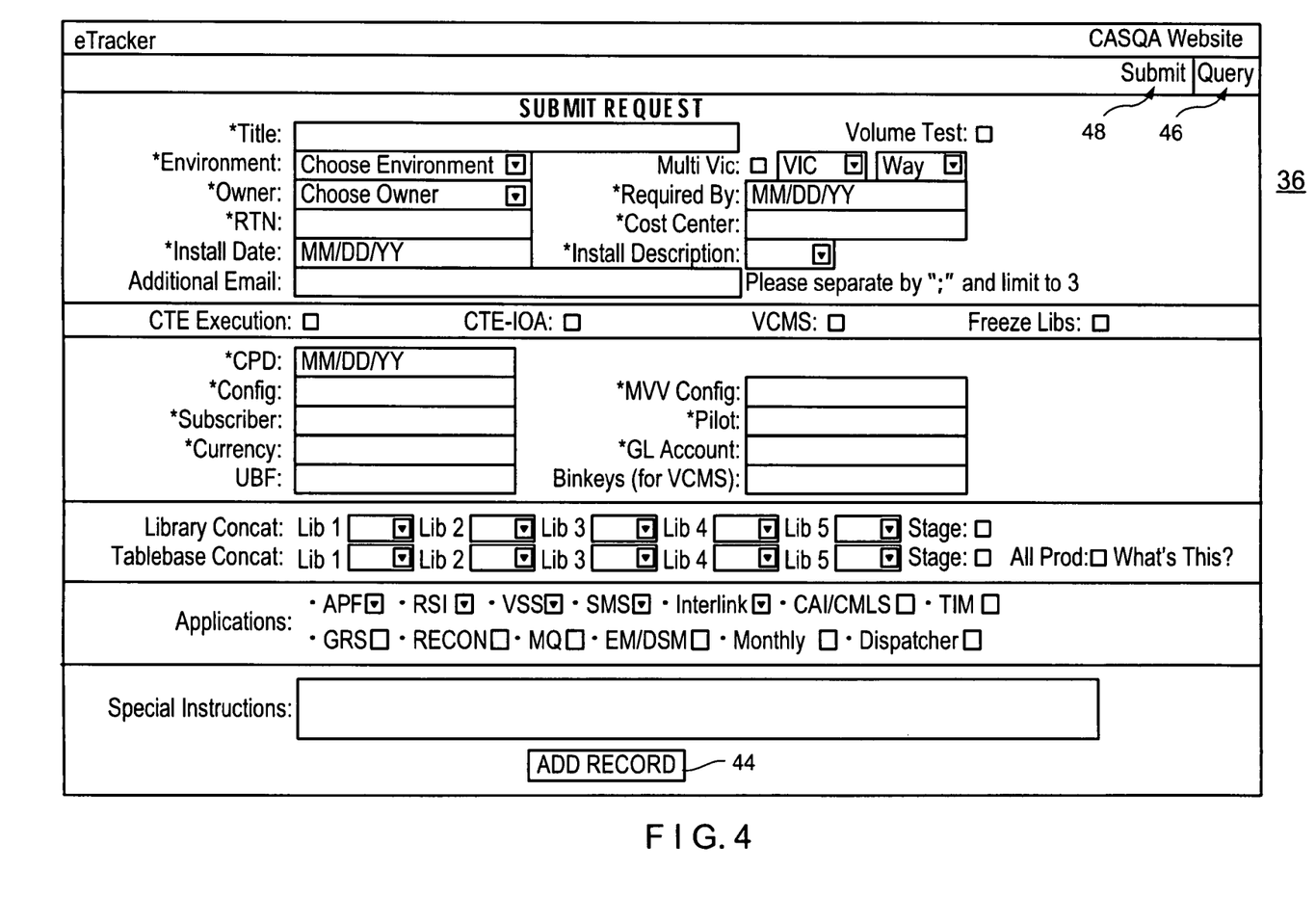
FIG. 4 is a screen shot of a web page for submitting a test environment setup request.

Referring to FIG. 4, when the request management module 34 is executed by the processor 26, the submit request (setup request) web page 36 is the initial page displayed on the user's computer 8 which provides a standardized user interface screen to submit a request. The submit request page 36 includes required parameter fields and optional parameter fields. Each required parameter field is distinguishable from the optional parameter fields. In the embodiment shown, an asterisk ("*") is displayed next to the required field name. As shown in FIG. 4, the required fields are "Title", "Environment", "Owner", "Required By", "RTN", "Cost Center", "Install date", "Install Description", "CPD", "Config", "MVV Config", "Subscriber", "Pilot", and "Currency".

"Title" means the title of the setup request being submitted. As described in the background section, "RTN" stands for request tracking number which is a number assigned to a particular software modification project. Once the software changes related to a particular RTN are made, they are turned over to a software tester.

"Install date" refers to the date the RTN is to be released to the production system. "Install Description" is a description of the install which can be specified in a pull down menu. The choices are "business release", "maintenance", "emergency", "non-business" and "others". "Environment" refers to the test environment that needs to be created or regenerated based on the submitted setup request. The environment can be specified by the user using a pull-down menu.

"Owner" refers to the person who will handle the particular RTN. "Required By" is the date by which the test environment setup request should be completed. "Cost Center" is an identifier identifying the business unit that is responsible for the cost of providing the software modification project (RTN).

"CPD" stands for central processing date. This date specifies the latest date that any test transaction data can have. For example, in a credit card processing system, the test transaction data are credit card transactions and the date of any credit card transaction in the test data cannot be later than the central processing date.

"Config" contains card issuer information data used by various systems in a card transaction processing system to determine how to collect, deliver and settle issuer data. "MVV Config" is used by the card transaction processing system to identify a merchant entity. "Subscriber" refers to set-up details. "Pilot" is similar to "Subscriber" and contains issuer parameter set-ups. "Currency" refers to a currency file that contains all the currencies and their equivalent conversion rates to different currencies for a year.

The remaining fields on page 36 are optional fields. "Additional Email" can be used to specify additional emails to which a confirmation email of a submitted request is to be sent. "GL Account" has general ledger information. "UBF" refers to universal billing information. "Binkeys (for VCMS)" refers to a bin file that is used to override the issuer list for testing purposes.

"Library Concat" is used to specify up to five libraries chosen from a set of ten QA (quality assurance) libraries. If the field "Stage" is checked, that means the testing should be done using only what is in the production system.

Similarly, "Tablebase Concat" can be used to specify up to five table bases from a set of eight existing table bases.

The "Special Instructions" field is used to insert user comments and instructions to the IT department receiving the setup request.

Below the "Additional Email:" field, there are four fields that can be checked: "CTE Execution", "CTE-IOA", "VCMS" and "Freeze Libs". CTE stands for a group within an IT department called central testing environment. If the "CTE Execution" field is checked, that means the user would like CTE to execute the test environment. If the "CTE IOA" field is checked, however, the user would like CTE to just create the schedule of jobs. "VCMS" stands for Visanet certification member system. If this field is checked, the user would like to use the library of a member bank (e.g., card issuer bank). If "Freeze Libs" is checked, that means the user would like to use a backup copy of whatever is in production.

In the "Applications" field, there are 13 input fields that can be checked. These are application programs that need to be added in the test environment if their corresponding boxes are checked. For example, "RSI" and "VSS" respectively stand for Real-time Settlement Interface program and Visanet Settlement System program.

The "Special Instructions" comment field allows the user to provide special instructions to the administrator who will be preparing the test environment.

Once the submit request page 36 has been filled in, an "Add Record" link 44 is used to add the submit request to the setup request database 14. Once the Add Record link 44 is clicked by the user, the request management module 34 performs error checking to ensure that all of the fields are in correct format. For example, if the year in the date format for the "Install Date" field is in the wrong format of "Dec. 5, 2010", the request management module 34 generates an error message along with a prompt to correct the erroneous format.

Prior to adding the submit request in the setup request database 14, the request management module 34 also checks to ensure that all of the required fields are populated. In the embodiment shown, the module 34 ensures that all of the fields with an asterisk are populated. If not, an error message is generated and the user is prompted to input the missing required field. Such error checking ensures that the initial submission of a request for environment setup is sufficient for an administrator to set up the test environment without going back to the user for more information.

Once all of the parameters in the displayed fields are determined to be correctly populated and all of the required parameters are determined to be populated, the request management module 34 adds the setup request record to the setup request database 14. Then, the module 34 sends a confirmation email to the requester submitting the test environment setup request and to any other email addresses specified in the "Additional Email" field.

Figure 5:
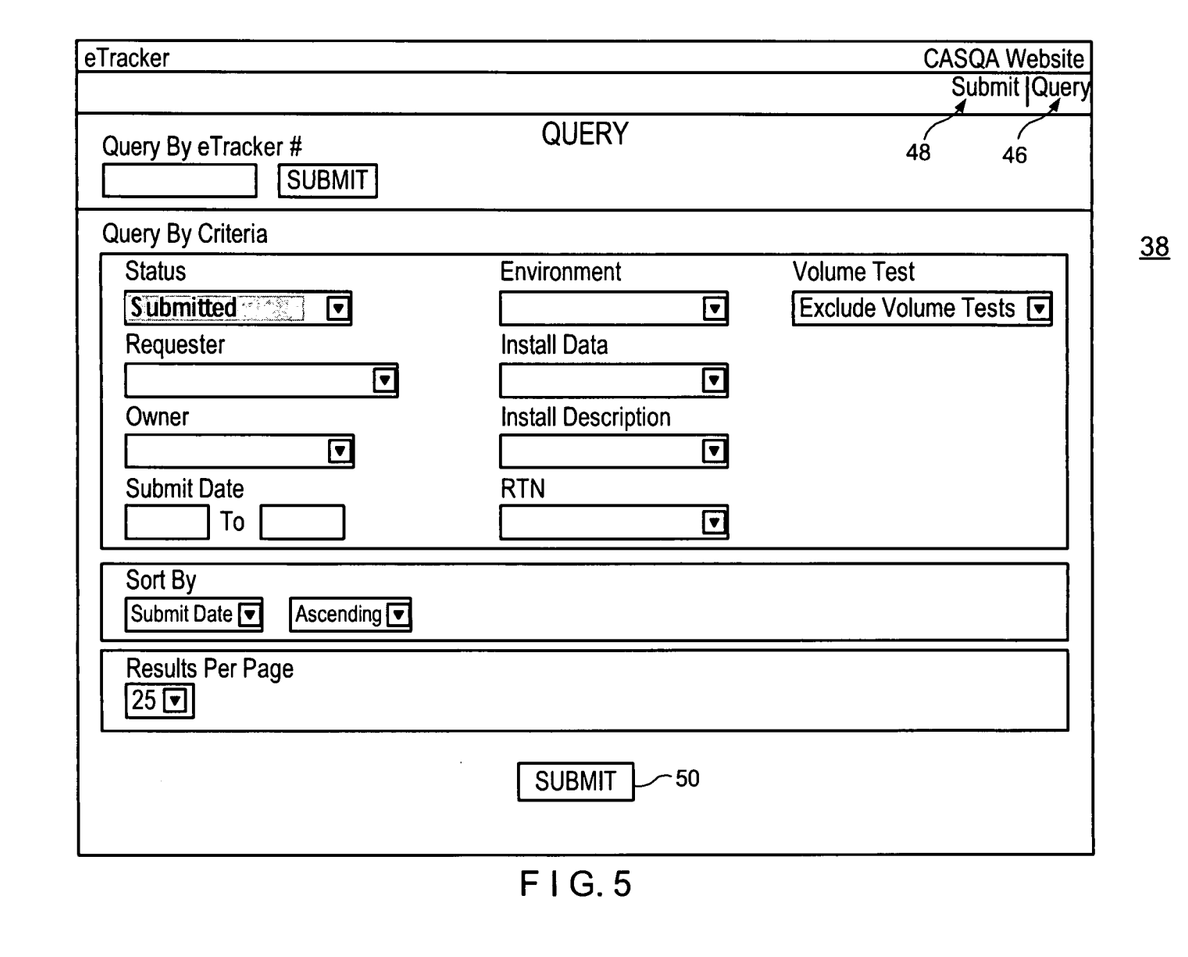
FIG. 5 is a screen shot of a query web page for submitting selection criteria to retrieve test environment setup request records.

On the submit request web page 36, clicking on a query link 46 generates the query web page 38 as shown in FIG. 5. The query web page 38 allows a user to specify selection criteria to retrieve selected setup records from the database 14. In the embodiment shown, the setup request records can be search by, for example, a requester of the setup request, owner of the setup request, install date related to the setup request, RTN and the like. Of course, multiple search criteria can be used to narrow the selection. In the embodiment shown, the user has requested retrieval of all setup requests that have been submitted but not yet completed.

Figure 6:
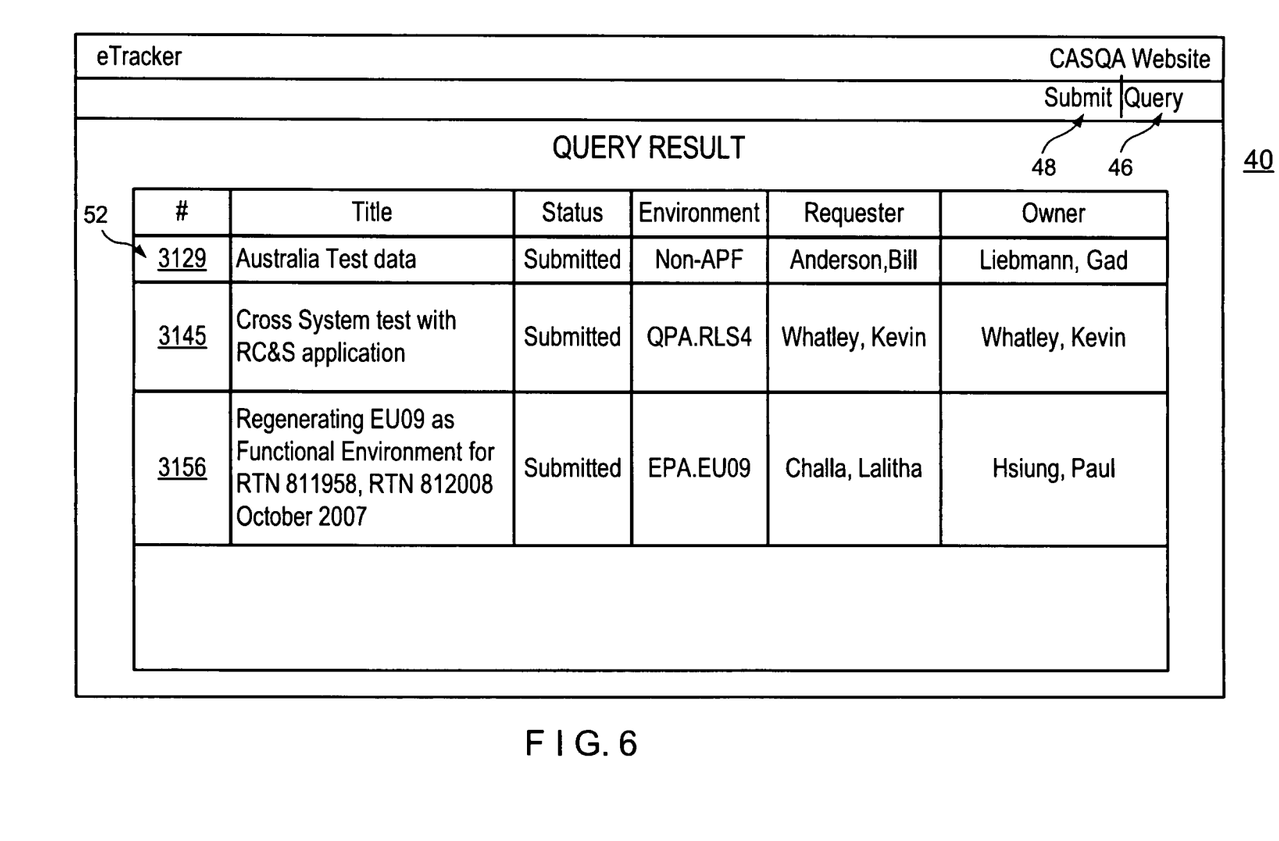
FIG. 6 is a screen shot of a web page for displaying selected test environment setup request records.

Clicking on a submit button 50 at the bottom of the query page 38 submits the query to the request management module 34. The module 34 retrieves selected setup request records from the setup request database 14 and generates the query result web page 40 as shown in FIG. 6. In the query result page 40 shown, the request management module 34 has retrieved three setup request records that matched the selection criteria of FIG. 5. Each row represents one retrieved setup request record and includes "#" (an internal number assigned to the request when added to the database 14), title, status, environment and owner. Although only six fields are displayed due to the display screen's horizontal size limitation, the request management module 34 can be programmed to display any number of fields in the database record.

Figure 7:
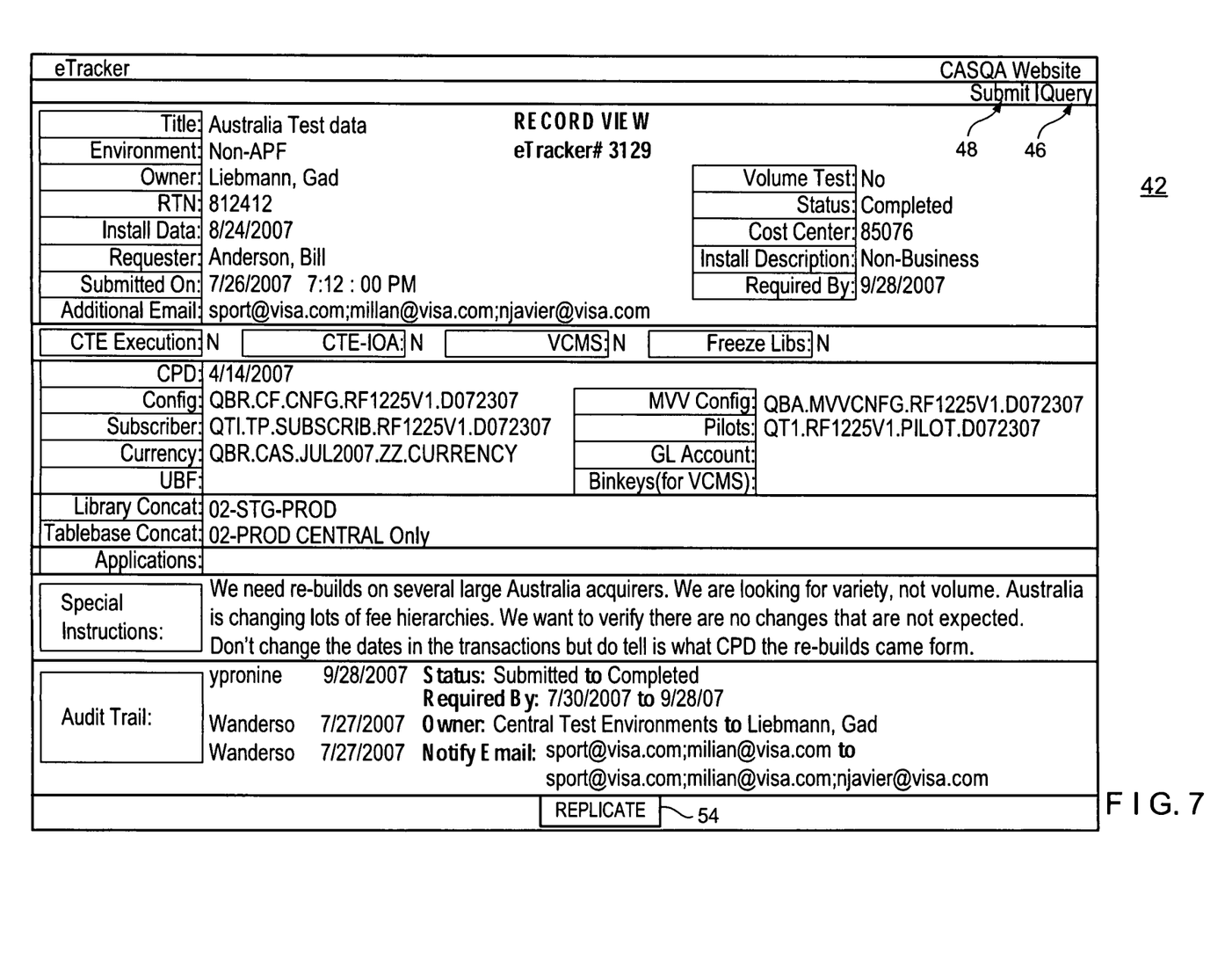
FIG. 7 is a screen shot of a web page for displaying a single test environment setup request record.

The field displaying the internally assigned request number is also a link 52. Upon selecting and clicking on one of the links 52, the request management module 34 generates the record view web page 42 for the selected setup request record as shown in FIG. 7. In the embodiment shown, the user has selected the link for record number 3129. The web page 42 shows all of the fields of the selected record.

The Record View web page 42 contains a replicate button 54. Upon clicking of the button 54, the request management module 34 goes back to displaying the submit request web page 36 and populates all of the displayed fields with those from the Record View web page 42. This replicate feature allows the user to search for a similar environment setup request that has been submitted in the past and let the request management module 34 replicate the fields in a new setup request page. Advantageously, this feature saves the time it takes to manually enter all of the field parameters and reduces possible typing errors.

In any of the web pages 36-42, the user can go to the query page 38 and submit request page 36 by clicking on the respective links 46 and 48.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system for managing a plurality of new test computer environment creation requests comprising:
 a creation request database storing a plurality of new test computer environment creation requests, each new test computer environment creation request including a plurality of test computer environment creation parameters for creating a computer test environment, wherein the test computer environment creation parameters contain a designation of a test set of financial transaction data; and
 a processor disposed in communication with the creation database, and configured to issue a plurality of processing instructions to:
  receive test computer environment creation parameters from a user;
  determine whether the received test computer environment creation parameters include all required information to create an operable computer test environment;
  request additional information from the user if it is determined that the received test computer environment creation parameters do not include all of the required information;
  create a creation request record including the received test computer environment creation parameters in the creation request database;
  build a new computer environment using the creation request record; and
  populate the new computer environment with the test set of financial transaction data.

2. The system according to claim 1, wherein the processor issues instructions to:
 transmit a creation request page for display at a user computer, the creation request page displaying input parameter fields; and each displayed field of required parameters being distinguishable from the displayed fields of optional parameters.

3. The system according to claim 1, wherein the processor issues instructions to store the received test computer environment creation parameters in the creation request database if it is determined that the received test computer environment creation parameters include all of the required information.

4. The system according to claim 1, wherein the processor issues instructions to:
retrieve, according to user input, a particular test computer environment creation request from the creation request database; and
upon receiving a request to replicate the retrieved test computer environment creation request, create a creation request page, for display at a user computer, which is pre-populated with the parameters from the retrieved test computer environment creation request.

5. The system according to claim 1, wherein the processor issues instructions to receive the test computer environment creation parameters through a web browser of the user.

6. The system according to claim 1, wherein the processor issues instructions to retrieve selected ones of the plurality of test computer environment creation requests stored in the creation request database and prepare a report based on the retrieved test computer environment creation requests.

7. The system according to claim 6, wherein the processor issues instructions to:
generate the report as a web page viewable by a web browser; and
update the test computer environment creation parameters stored in the creation request database by a user through the web browser.

8. The system according to claim 6, wherein the processor issues instructions to:
receive an identifier of a software modification project that affects one or more software applications;
retrieve, from the creation request database, selected test computer environment creation requests that are related to the received project identifier; and
prepare the report based on the retrieved test computer environment creation requests.

9. The system according to claim 8, wherein the processor issues instructions to generate the report as a web page viewable by a web browser.

10. A system for managing a plurality of job control language (JCL) new test computer environment creation requests comprising:
a creation request database storing a plurality of JCL new test computer environment creation requests, each new test computer environment creation request including JCL test computer environment creation parameters for running a JCL job and a designation of a test set of financial transaction data; and
a processor disposed in communication with the creation database, and configured to issue a plurality of processing instructions to:
receive test computer environment creation parameters from a user;
determine whether the received test computer environment creation parameters include all required parameters to create an operable JCL computer test environment;
request missing parameters if it is determined that the received test computer environment creation parameters do not include all of the required parameters;
create a creation request record including the received test computer environment creation parameters in the creation request databases;
build a new computer environment using the creation request record; and
populate the new computer environment with the test set of financial transaction data.

11. The system according to claim 10, wherein the processor issues instructions to:
transmit a creation request page for display at a user computer, the creation request page displaying input parameter fields; and
each displayed field of the required parameters being distinguishable from the displayed fields of optional parameters.

12. The system according to claim 10, wherein the processor issues instructions to:
retrieve, according to user input, a particular test computer environment creation request from the creation request database; and
upon receiving a request to replicate the retrieved test computer environment creation request, create a creation request page, for display at a user computer, which is pre-populated with the parameters from the retrieved test computer environment creation request.

13. The system according to claim 10, wherein the processor issues instructions to retrieve selected ones of the plurality of test computer environment creation requests stored in the creation request database and prepare a report based on the retrieved test computer environment creation requests.

14. The system according to claim 13, wherein the processor issues instructions to:
generate the report as a web page viewable by a web browser; and
update the test computer environment creation parameters stored in the creation request database by a user through the web browser.

15. A method of managing a plurality of new test computer environment creation requests comprising:
providing a creation request database storing a plurality of new test computer environment creation requests, each new test computer environment creation request including a plurality of test computer environment creation parameters for creating a computer test environment, wherein the test computer environment creation parameters contain a designation of a test set of financial transaction data;
receiving, from a user, test computer environment creation parameters for requesting a test computer environment creation;
determining whether the received test computer environment creation parameters include all required information;
requesting additional information from the user if it is determined that the received test computer environment creation parameters do not include all of the required information;
creating a creation request record including the received test computer environment creation parameters in the creation request database;
building a new computer environment using the creation request record; and
populating the new computer environment with the test set of financial transaction data.

16. The method according to claim 15, wherein:
the step of receiving includes receiving test computer environment creation parameters for requesting a JCL test computer environment creation; and
the step of determining includes determining whether the received test computer environment creation parameters include all required information to create the JCL test computer environment.

17. The method according to claim 15, prior to the step of receiving, further comprising the step of transmitting a creation request page for display at a user computer, the creation request page displaying input parameter fields and each displayed field of required parameters being distinguishable from the displayed fields of optional parameters.

18. The method according to claim 17, wherein each displayed field of the required parameters includes an asterisk symbol.

19. The method according to claim 15, further comprising:
retrieving, according to user input, a particular test computer environment creation request from the creation request database; and
upon receiving a request to replicate the retrieved test computer environment creation request, creating a creation request page, for display at a user computer, which is pre-populated with the test computer environment creation parameters from the retrieved creation request.

20. The method according to claim 15, wherein the step of receiving includes receiving the test computer environment creation parameters through a web browser of the user.

21. The method according to claim 15, further comprising:
retrieving selected ones of the plurality of test computer environment creation requests stored in the creation request database; and
preparing a report based on the retrieved test computer environment creation requests.

22. The method according to claim 21, wherein:
the step of preparing a report includes generating the report as a web page viewable by a web browser; and
the step of providing a creation request database includes providing the creation request database in which the test computer environment creation parameters stored in the creation request database are updatable by a user through the web browser.

\* \* \* \* \*